United States Patent
Hsu et al.

(10) Patent No.: US 11,112,353 B2
(45) Date of Patent: Sep. 7, 2021

(54) RESIDUAL TOXICANT DETECTION DEVICE

(71) Applicant: INDUSTRIAL TECHNOLOGY RESEARCH INSTITUTE, Hsinchu (TW)

(72) Inventors: Chih-Hao Hsu, Taipei (TW); Jui-Hung Tsai, Toufen (TW); Ying-Hao Wang, Pingtung County (TW); Chia-Jung Chang, Douliu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 27 days.

(21) Appl. No.: 16/728,963

(22) Filed: Dec. 27, 2019

(65) Prior Publication Data
US 2021/0156791 A1 May 27, 2021

(30) Foreign Application Priority Data
Nov. 22, 2019 (TW) ................................ 108142432

(51) Int. Cl.
*G01N 21/25* (2006.01)

(52) U.S. Cl.
CPC ... *G01N 21/255* (2013.01); *G01N 2201/0221* (2013.01); *G01N 2201/062* (2013.01)

(58) Field of Classification Search
CPC ......... G01N 21/255; G01N 2201/0221; G01N 2201/062
See application file for complete search history.

(56) References Cited

U.S. PATENT DOCUMENTS

| 6,563,110 B1 * | 5/2003 | Leri ........................ H05F 3/06 204/164 |
| 9,417,206 B2 | 8/2016 | Wang et al. |

(Continued)

FOREIGN PATENT DOCUMENTS

| CN | 205246515 u | 5/2016 |
| CN | 205262962 U | 5/2016 |

(Continued)

OTHER PUBLICATIONS

Taiwanese Office Action and Search Report, dated Aug. 5, 2020, for Taiwanese Application No. 108142432.

*Primary Examiner* — Jamil Ahmed
(74) *Attorney, Agent, or Firm* — Birch, Stewart, Kolasch & Birch LLP

(57) ABSTRACT

A residual toxicant detection device for testing residual toxicant in an aqueous solution is disclosed, which includes a first space cavity, a second space cavity, a connecting frame and a sensing cavity. The first space cavity includes a light source and a lens. The second space cavity includes a photo sensor and a circuit module. The connecting frame is configured to connect the first space cavity and the second space cavity. The sensing cavity for receiving an aqueous solution is formed between the first space cavity and the second space cavity and at one side of the connecting frame. The light source emits a light with a wavelength range. The photo sensor receives the sensing signal of the light passing through the sensing cavity. The circuit module is configured to calculate the absorbance and the variation in absorbance of the residual toxicants in the aqueous solution.

16 Claims, 7 Drawing Sheets

(56) References Cited

U.S. PATENT DOCUMENTS

| | | | | |
|---|---|---|---|---|
| 2016/0274028 A1* | 9/2016 | Sclip | ............... | G01N 21/41 |
| 2018/0059015 A1* | 3/2018 | Li | ............... | G01N 21/359 |
| 2018/0143128 A1* | 5/2018 | Tsai | ............... | G01N 33/1826 |

FOREIGN PATENT DOCUMENTS

| | | |
|---|---|---|
| TW | 200634297 | 10/2006 |
| TW | 201400811 A | 1/2014 |
| TW | 201422374 A | 6/2014 |
| TW | 201510502 a | 3/2015 |
| TW | 201609540 A | 3/2016 |
| TW | I620930 | 4/2018 |
| TW | M575104 U | 3/2019 |
| TW | i662265 B | 6/2019 |

\* cited by examiner

RESIDUAL TOXICANT DETECTION DEVICE

This application claims the benefit of Taiwan application Ser. No. 108142432, filed Nov. 22, 2019, the disclosure of which is incorporated by reference herein in its entirety.

TECHNICAL FIELD

The disclosure is related to a residual toxicant detection technology, and is more particularly related to a residual toxicant detection device for detecting the variation of toxicant in an aqueous solution.

BACKGROUND

Most of the food inspection is based on sampling inspection. Under the circumstances when food safety has attracted people's close attention, the detection of residual toxicants becomes a very important issue. For example, when fruit and vegetables are harvested, there may be pesticide residuals on their surface. However, people seldom perform detections to make sure whether there are any pesticide residuals on the fruit and vegetables.

The most commonly used methods for detecting residual toxicants include the biochemical method and the spectrum method. In the biochemical method, the fast screening test is based on biochemical enzyme inhibition and requires a fixed specimen sampling and a biochemical enzyme reaction and therefore has a low level of acceptability to consumers. The most commonly used biochemical methods can only be used to detect pesticides formed of organophosphorus and carbamates, and cannot be used to detect all pesticides. Besides, the biochemical method further has the problem of incorrectness of detection, and may be unable to effectively detect the banned pesticides in particular. Considering that general people will detect residual toxicants at home, the biochemical method is lowly applicable for the detection of residual toxicants at home since it requires many complicated procedures similar to that performed in laboratory.

The spectrum method determines the variety and the concentration of the pesticides according to spectrum comparison. Given that there are more than 300 registered pesticides in use, database comparison requires a large volume of data and therefore involves a high level of difficulty. Besides, the spectrum method cannot avoid quantitative sampling, and therefore it is lowly acceptable to consumers. Moreover, both the liquid chromatography and mass spectrometry connected in series (LC/MS/MS) test and the high-performance liquid chromatography (HPLC) test are very expensive and time-consuming, and therefore they cannot be used widely.

Therefore, it has become a prominent task for people of the technology field to provide a residual toxicant detection technology, which is suitable to be used at home and capable of effectively monitoring whether the residual toxicant of the pesticides is removed without damaging the object under detection or consuming a large volume of power.

SUMMARY

The disclosure is directed to provide a residual toxicant detection mechanism and a device using the detection mechanism. The detection device uses the absorbance and the variation in absorbance of the residual toxicants continuously detected in a water solution as a basis for determining whether the removal of the residual toxicant in the water solution meets a predetermined standard. The detection device is suitable for the detection of residual toxicants at home.

According to one embodiment, a residual toxicant detection device for testing a residual toxicant in an aqueous solution is disclosed. The residual toxicant detection device includes a first space cavity, a second space cavity, a connecting frame and a sensing cavity. The first space cavity includes a light source and a lens. The second space cavity includes a photo sensor and a circuit module. The connecting frame is configured to connect the first space cavity and the second space cavity. The sensing cavity for receiving an aqueous solution is formed between the first space cavity and the second space cavity and on one side of the connecting frame. The light source emits a light with a specific wavelength range. The photo sensor receives the sensing signal of the light passing through the sensing cavity. The circuit module is configured to calculate the absorbance and the variation in absorbance of the residual toxicants in the aqueous solution.

According to the residual toxicant detection device of the present disclosure, the absorbance of the residual toxicant in a water solution is detected through a photo sensing mechanism. The residual toxicant detection device of the present disclosure is handheld type and can be placed into the aqueous solution. The residual toxicant detection device of the present disclosure performs detection after the aqueous solution enters the detection cavity, and then displays the detection result through lamp indication. The residual toxicant detection device of the present disclosure can be used for the detection of residual toxicants at home. Furthermore, with the integrated design, the residual toxicant detection device of the present disclosure not only provides waterproof and wireless charging capabilities, but also achieves a high degree of practicality. Additionally, the design of combining the LED light source with the lens further reduces the cost.

The above and other aspects of the invention will become better understood with regard to the following detailed description of the preferred but non-limiting embodiment (s). The following description is made with reference to the accompanying drawings.

Figure 1:
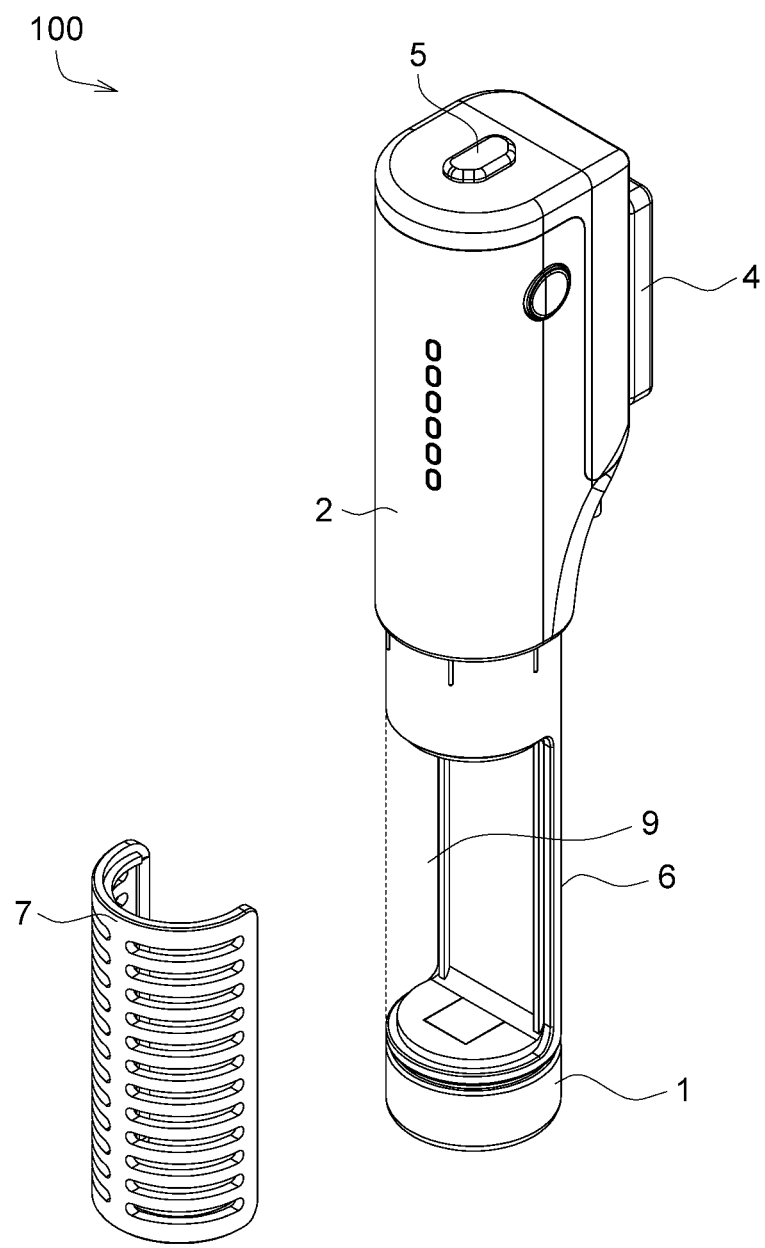
FIG. 1 is an appearance diagram of a residual toxicant detection device according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The technical content of the present invention is disclosed below in a number of embodiments with accompanying drawings. Any person ordinary skilled in the technology of the present invention can easily understand the advantages and effects of the present disclosure through the specification. The present disclosure can also be implemented or applied in other embodiments.

Figure 2:
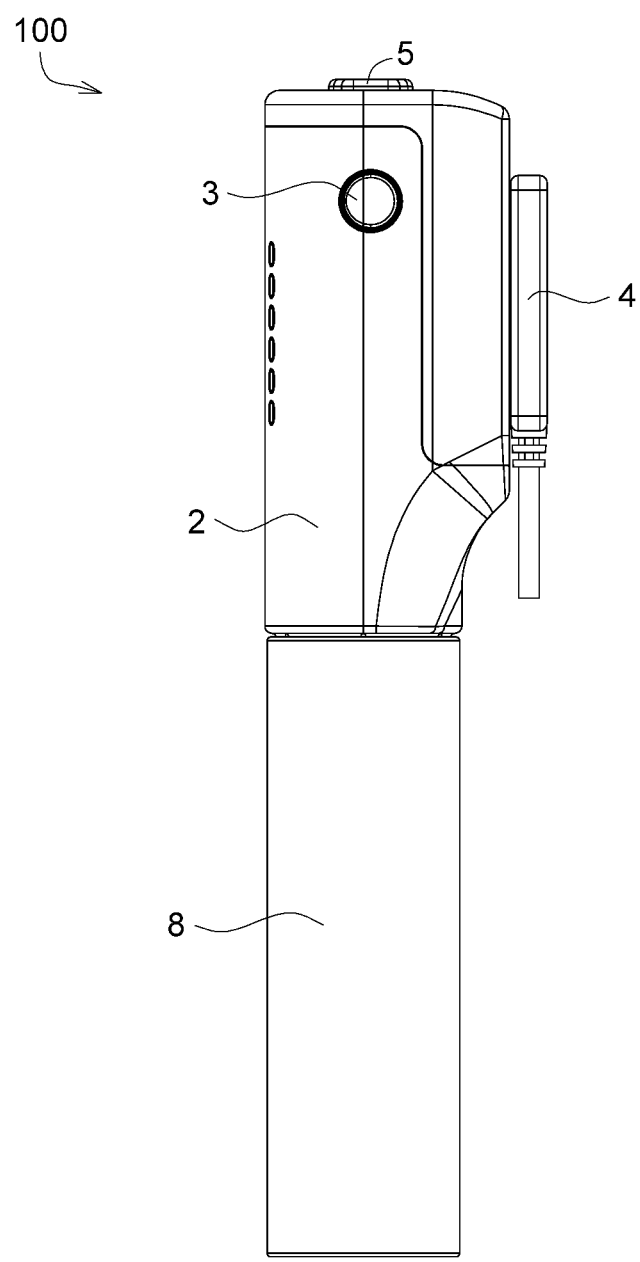
FIG. 2 is an explosion diagram of a residual toxicant detection device according to an embodiment of the present disclosure.

Refer to FIG. 1 and FIG. 2, appearance diagram and explosion diagram of a residual toxicant detection device according to an embodiment of the present disclosure are shown. The residual toxicant detection device 100 of the present disclosure has a handheld size and a cylindrical appearance. The residual toxicant detection device 100 of FIG. 1 includes a first space cavity 1, a second space cavity 2, a switch button 3, a charging device 4, a USB cover 5, a connecting frame 6 and a sensing cavity cover 7. The upper half of the residual toxicant detection device 100 of FIG. 2 includes a second space cavity 2, a switch button 3, a charging device 4, a USB cover 5 and a lower half of a dust-proof cap 8. In the present embodiment, the housings of the first space cavity 1, the second space cavity 2 and the connecting frame 6 are integrally formed in one piece. However, the first space cavity 1, the second space cavity 2 and the connecting frame 6 can also be interlocked in one piece. FIG. 1 is different from FIG. 2 in that the lower half of the residual toxicant detection device 100 of FIG. 1, including the connecting frame 6, the sensing cavity cover 7 and the first space cavity 1, are illustrated with the dust-proof cap 8 being removed. Refer to FIG. 1. After the sensing cavity cover 7 is removed, the lower half of the residual toxicant detection device 100 of FIG. 1 illustrates the connecting frame 6 and a sensing cavity 9 for receiving an aqueous solution. The lower half of the residual toxicant detection device of FIG. 2 only illustrates the dust-proof cap 8 under which the connecting frame 6, the sensing cavity cover 7, the sensing cavity 9 and the first space cavity 1 which are illustrated in FIG. 1 are covered. When the residual toxicant detection device 100 is not in use, the dust-proof cap 8 can prevent dust or fine particles from entering the sensing cavity and causing pollution.

Figure 3A:
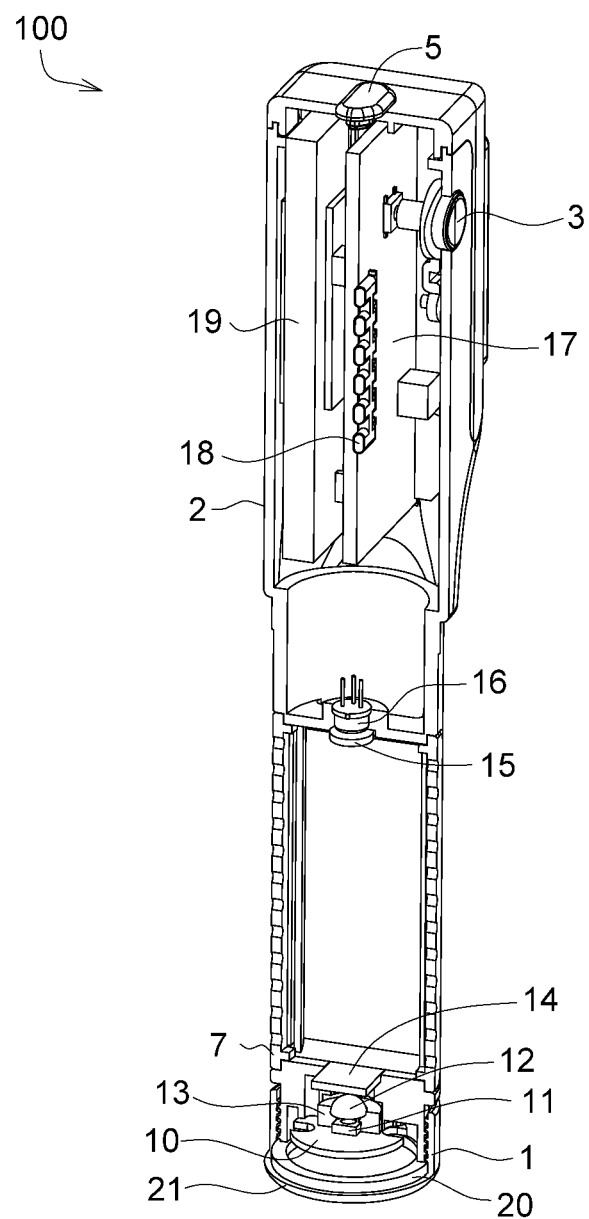
FIG. 3A is a front cross-sectional view of a residual toxicant detection device according to an embodiment of the present disclosure.

Refer to FIG. 3A, a front cross-sectional view of a residual toxicant detection device 100 according to an embodiment of the present disclosure is shown. The residual toxicant detection device 100 mainly includes a first space cavity 1, a second space cavity 2, and a connecting frame 6. The connecting frame 6, mainly configured to connect the first space cavity 1 and the second space cavity 2, has a hollowed portion for receiving a power cable, such that the power cable can be extended to the first space cavity 1 from the second space cavity 2 for connecting relevant circuits to the light source 11. Besides, the interior of the first space cavity 1 includes a substrate 10, a light source 11, a lens 12, a fixing ring 13, a first window 14, and a waterproof ring 22. Relevant descriptions of the first space cavity 1 will be disclosed below.

Figure 3B:
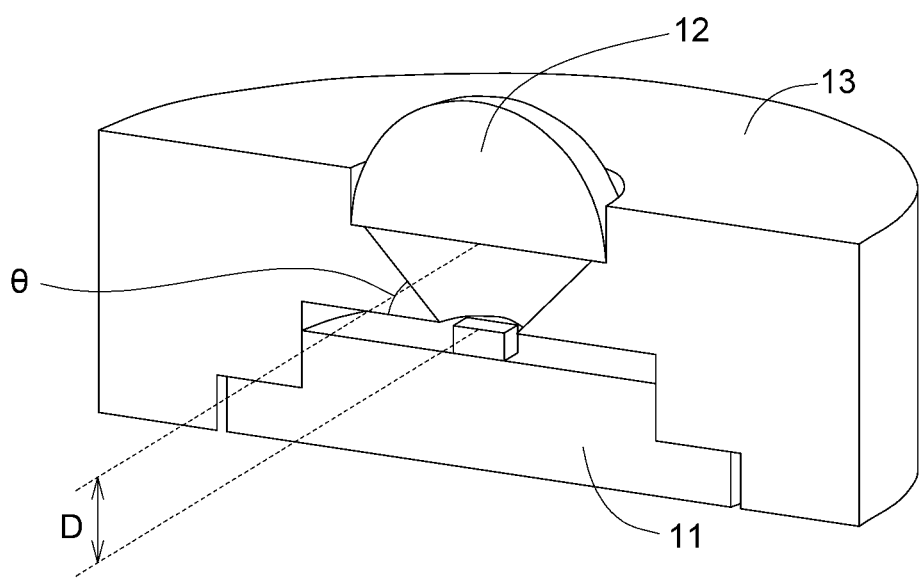
FIG. 3B is an enlarged view of the first space cavity of the residual toxicant detection device of the present disclosure.

Refer to FIG. 3A and FIG. 3B simultaneously. FIG. 3B is an enlarged view of the first space cavity of the residual toxicant detection device 100 of the present disclosure. The first space cavity 1 includes a substrate 10, a light source 11, a lens 12, a fixing ring 13 and a first window 14, wherein the light source 11 is fixed on the substrate 10 and is separated from the lens 12 by a fix distance D. In the present embodiment, the bottom and the top of the fixing ring 13 are respectively configured to fix the light source 11 and the lens 12 such that the light source 11 and the lens 12 maintain the fix distance D. Refer to FIG. 3B. The bottom of the fixing ring 13 has an inverted ladder structure configured to fix the light source 11. Meanwhile, the fixing ring 13 has a funnel-shaped structure at an end by which the fixing ring 13 fixes the lens 12, wherein the side wall of the funnel-shaped structure has an angle of inclination Θ extended upwards at the part close to the light source 11, wherein, the angle of inclination Θ can be changed according to the beam angle of the light source to increase the utilization rate of the light emitted by the light source 11. In an embodiment, the side wall of the funnel-shaped structure has an angle of inclination of 30°. When the height of the side wall is equivalent to the fix distance, the angle of inclination of the fixing ring changes to 90° form 30° and extends to the top of the fixing ring in a direction perpendicular to the base plane.

The light source 11 can be separated from the lens 12 by a fix distance D through the fixing ring disclosed above or other methods, such as a frame (not illustrated), such that after the light emitted by the light source 11 passes through the lens 12, the light will be nearly parallel light and enter the sensing cavity 9 pass through the first window 14. In an embodiment, the substrate 10 can be a substrate with cooling function capable of downwardly dissipating the heat generated the light source 11.

In order to detect as many toxicants as possible, the light source 11 can emit a light with a specific wavelength range. Also, the light source 11 can be a surface mounted device (SMD) LED, but the invention is not limited thereto. The light emitted by the light source 11 has a specific wavelength range. In an embodiment, examples of the specific wavelength range include 220~240 nanometers, 250~270 nanometers, and 270~290 nanometers. Moreover, the lens 12 can be a semi-spherical lens formed by plastic injection molding, but the invention is not limited thereto. In an embodiment, if the lens 12 is a semi-spherical lens and has a diameter of 5 mm (ø5 mm), the fix distance D between the light source 11 and the lens will be set to a range of 1.1 mm-1.4 mm, such that the photo sensor can receive the maximum sensing signal.

Refer to FIG. 3A and FIG. 3B. The first space cavity 1 further includes a waterproof O-ring 20 and a bottom lid 21, which can be combined to prevent external liquid from entering the first space cavity 1, such that all elements in the first space cavity 1 can operate normally and keep a dry state.

Refer to FIG. 3A. The interior of the second space cavity 2 further includes a second window 15, a photo sensor 16, a circuit module 17, a display unit 18, and a battery 19 in addition to the switch button 3 and the USB cover 5 as indicated in FIG. 1. The second window 15 is configured to guide the light to pass the first window 14 and the sensing cavity 9 and enter the second space cavity 2 to be received by the photo sensor 16, such that the variation in absorbance can be calculated after the light passes through the sensing cavity.

Figure 4:
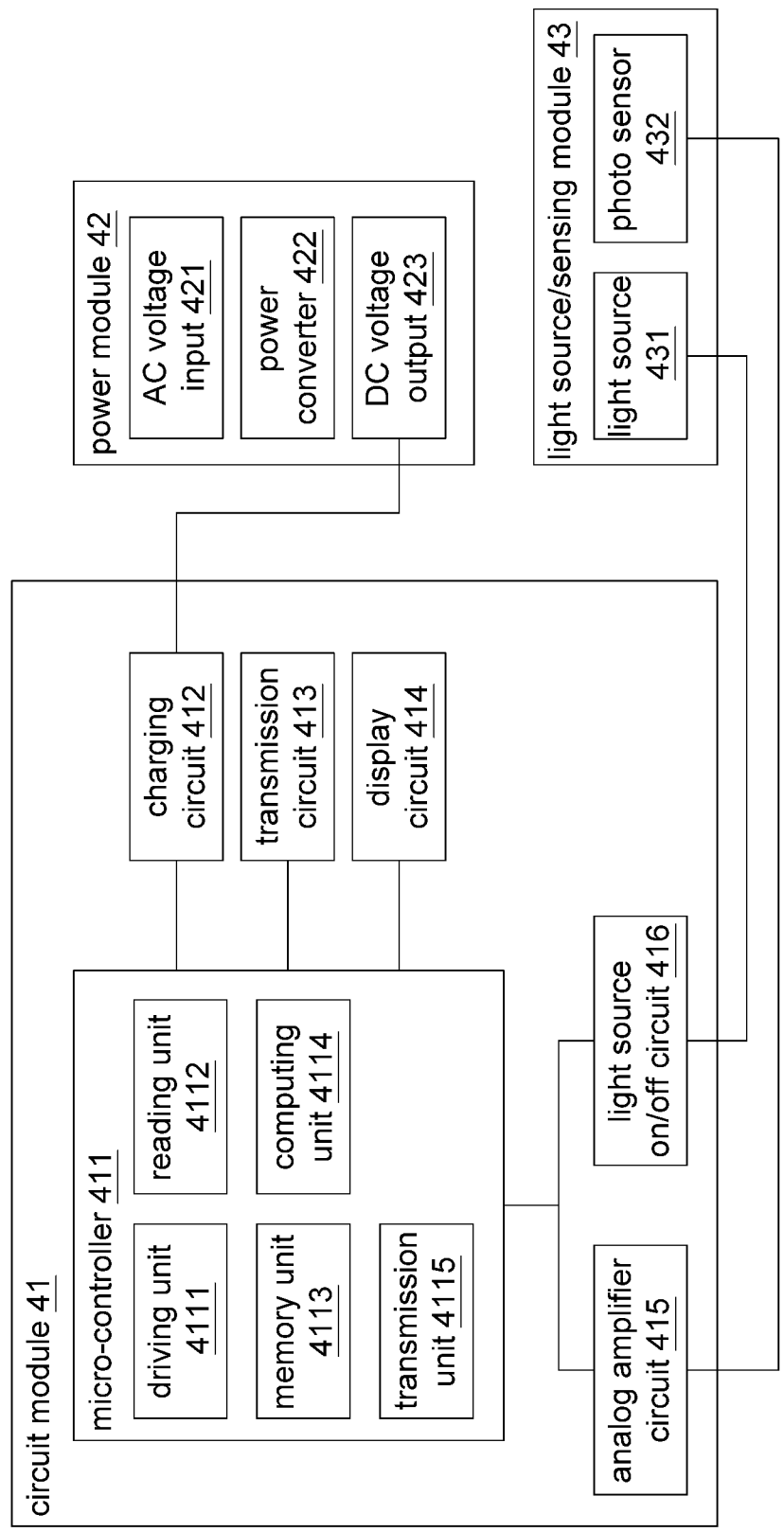
FIG. 4 is a system frame diagram of a residual toxicant detection device according to an embodiment of the present disclosure

FIG. 4 is a system architecture diagram of a residual toxicant detection device 100 according to an embodiment of the present disclosure. As indicated in FIG. 4, the system architecture 40 includes a circuit module 41, a power module 42 and a light source/sensing module 43. The circuit module 41 at least includes a micro-controller 411 and peripheral circuits 412~416. The power module 42 at least includes an AC voltage input 421, a DC voltage output 423 and a power converter 422. The light source/sensing module 43 at least includes a light source 431 and a photo sensor 432.

As indicated in FIG. 4, the circuit module 41 can perform the calculation of several functions. The main function of the circuit module 41 is to calculate the absorbance and the variation in absorbance of the residual toxicants in the aqueous solution according to the sensing signal. That is, the circuit module 41 can calculate the absorbance of the residual toxicant in the aqueous solution according to the sensing signal detected by the photo sensor and the light source, and further obtain the variation in the absorbance.

Relevant functions and operations of the circuit module 41 are indicated in FIG. 4. The circuit module 41 has a micro-controller 411 (MCU), which includes a driving unit 4111, a reading unit 4112, a memory unit 4113, an operation unit 4114 and a transmission unit 4115, but the invention is not limited thereto. Different circuits such as the charging circuit 412, the transmission circuit 413, the display circuit 414, the analog amplifier circuit 415 and the light source on/off circuit 416, are provided in response to different functions of the circuit module 41, such as calculation, control, driving, transmission and display.

Furthermore, the micro-controller 411 is configured to control the operation of the light source 431 through the light source on/off circuit 416. In the present embodiment, the light source on/off circuit 416 is configured to control the light source 431. The analog amplifier circuit 415 is connected to the photo sensor 432 for amplifying the sensing signal of the photo sensor. Moreover, the reading unit 4112 of the micro-controller is configured to read the sensing signal from the photo sensor at a fixed time interval. The memory unit 4113 of the micro-controller is configured to store the sensing signal. The micro-controller of the operation unit 4114 is configured to calculate the variation in absorbance according to the sensing signal and a correction value. In an embodiment, the correction value (which includes voltage or power can also be referred as background value) can be obtained before the photo sensor performs detection. That is, the value of the sensing signal can be obtained in the absence of a to-be-tested object. The absorbance can be calculated according to formula (1).

$$\text{Absorbance} = N * \log(\text{detection value}/\text{correction value}) \quad (1)$$

Wherein, N is a variable, and the detection value is the value of the sensing signal obtained when the photo sensor performs detection (includes voltage or power), and a detection result can be generated according to the variable N and the detection value. The transmission unit 4115 of the micro-controller 411 is configured to transmit the detection result to the display unit or other external device. The external device can be a corresponding device or an electronic device such as mobile phone, microcomputer, PC table or notebook. In an embodiment, the power module 42 can output a DC voltage to the charging circuit 412.

In an embodiment as indicated in FIG. 3A, the display unit 18 is configured to display the detection result. For example, the display unit can be connected to a light guide column or a display screen through LED lamps for displaying the detection result on the outer casing of the residual toxicant detection device. Apart from the main elements disclosed above, the residual toxicant detection device 100 further includes other elements to form a residual toxicant detection device with wireless charging capability. Besides, the battery 19 is disposed in the second space cavity of the residual toxicant detection device 100 for providing power for the operation of the light source 11 in the first space cavity and the photo sensor 16, the circuit module 17 and the display unit 18 in the second space cavity. In an embodiment, the residual toxicant detection device, the first space cavity 1, the second space cavity 2, the connecting frame 6 and the housing of the dust-proof cap 8 are formed of a waterproof material, such as metal or plastics, and provide waterproof effect to protect the elements disposed in the first space cavity and the second space cavity, but the invention is not limited thereto.

Figure 5A:
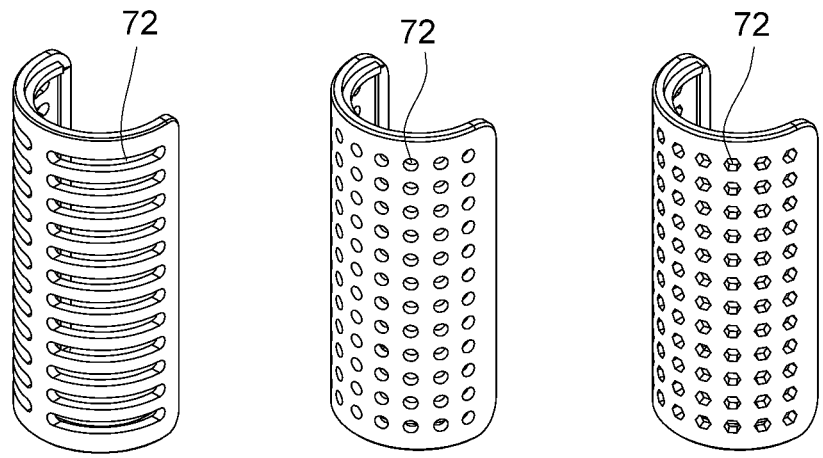
FIG. 5A is a schematic diagram of a sensing cavity cover of a residual toxicant detection device according to an embodiment of the present disclosure.

In an embodiment, the sensing cavity 9 of the residual toxicant detection device 100 is the first space cavity 1, the second space cavity 2, and the sensing cavity 9 formed between the sensing cavity cover 7 and the connecting frame 6, and the aqueous solution can flow within the sensing cavity. The sensing cavity cover 7 has a plurality of holes 72 formed thereon (as indicated in FIG. 5A). In short, the aqueous solution enters the sensing cavity 9 via the holes on the sensing cavity cover 7; meanwhile, the light source of the first space cavity 1 emits a light with a specific wavelength range which enters the sensing cavity 9 through the first window 14. The absorbance will change after the light with a specific wavelength range passing through the sensing cavity 9 is absorbed by the residual toxicant in the aqueous solution received in the sensing cavity 9. Then, the light further enters the photo sensor 16 of the second space cavity 2 through the second window 15, such that the change in the absorbance of the residual toxicant in the aqueous solution received in the sensing cavity 9 can be detected.

Furthermore, when the aqueous solution passes through the sensing cavity 9, the residual toxicant in the water solution will react with the light with a specific wavelength range such that the absorbance changes. The photo sensor will sense the light with a specific wavelength range passing through the sensing cavity and generate a sensing signal. Then, a detection result can be generated according to the sensing signal.

The residual toxicant detection device 100 further includes a wireless charging module (not illustrated), which can work with an external device to perform wireless charging function, and the generated power can be stored in the battery 19.

To perform detection, the light source 11 and the photo sensor 16 can be respectively disposed on two sides of the sensing cavity 9 such that the light emitted by the light source 11 will pass through the sensing cavity 9 and be sensed by the photo sensor 16. In the present embodiment, one light source 11 and one photo sensor 16 are exemplified, but the invention is not limited thereto. Plural light sources and photo sensors can be respectively disposed on two opposite sides of the first space cavity 1 and the second space cavity 2.

FIG. 5A is a schematic diagram of a sensing cavity cover of a residual toxicant detection device according to an embodiment of the present disclosure. As indicated in FIG. 1 and FIG. 5A, when the residual toxicant detection device is placed in an aqueous solution, the sensing cavity cover 7 causes the aqueous solution to enter the sensing cavity such that the residual toxicant detection device can detect the state of residual toxicants in the aqueous solution, wherein the sensing cavity cover includes a plurality of holes 72, which can be arranged neatly or alternately on the sensing cavity cover. As indicated in FIG. 5A, the shape of the holes can be one of rectangle circle or hexagon, but the invention is not limited thereto.

Figure 5B:
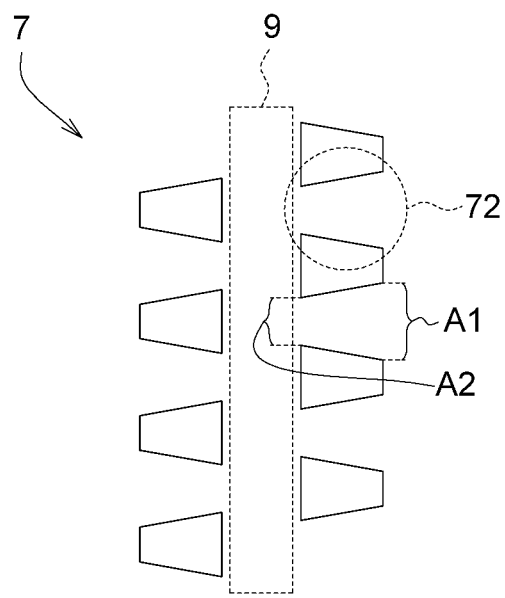
FIG. 5B is a cross-sectional view of a sensing cavity cover of a residual toxicant detection device according to an embodiment of the present disclosure.

FIG. 5B is a cross-sectional view of a sensing cavity cover of a residual toxicant detection device according to an embodiment of the present disclosure. As indicated in FIG. 5B, for the aqueous solution to pass through the holes on the sensing cavity cover 7 and enter the sensing cavity in which the aqueous solution can be detected, the area A1 of the first opening of each hole on the outer surface of the sensing cavity cover 7 is greater than the area A2 of the second opening of each hole on the inner surface of the sensing cavity cover. By the design of increasingly expanded holes, the bubbles of the aqueous solution entering the sensing cavity 9 can be accelerated and be removed lest the bubble might enter the sensing cavity 9 and affect the detection result during the detection process. Besides, a surface hydrophilic treatment is performed to the side of the first window 14 of the first space cavity 1 and the side of the second window 15 of the second space cavity 2 near the sensing cavity, such that the bubbles will not easily gather in front of the windows and the detection result can be improved.

According to the present disclosure, the variation in absorbance of the residual toxicants in the aqueous solution is calculated according to the sensing signal, and the determination mechanism is: increasing the cumulative count of detection if the variation in absorbance of the aqueous solution is less than a threshold value, and sending the detection result if the cumulative count of detection is greater than or is equivalent to a predetermined threshold. There is no need to know the variety of the toxicant in the aqueous solution. By detecting the variation in absorbance of the aqueous object in the aqueous solution, the removal efficiency of the residual toxicant in the aqueous solution can be obtained. Since the absorbance of the aqueous solution will continuously change during the cleaning process of the aqueous object, the detection device can continue with detection until the variation in absorbance is less than the predetermined threshold and reaches a particular cumulative count. If the predetermined count has been reached for several times, this implies that the residual toxicant of the aqueous object is already lower than the predetermined standard.

In an embodiment, the residual toxicant detection device calculates the variation in absorbance of the residual toxicants in the aqueous solution according to the sensing signal. Refer to FIG. 3A, the display unit 18 of the residual toxicant detection device 100 can display different colors, such as red, orange or green, according to the level of absorbance. The displayed color represents the state of residual toxicants in the aqueous solution. Through the displayed color, the detector can directly and easily understand the state of the aqueous solution.

As disclosed above, the detection method of the present disclosure is easy and simple without having to compare the database containing a large volume of toxicant data, and is therefore suitable for the use of ordinary people.

Figure 6:
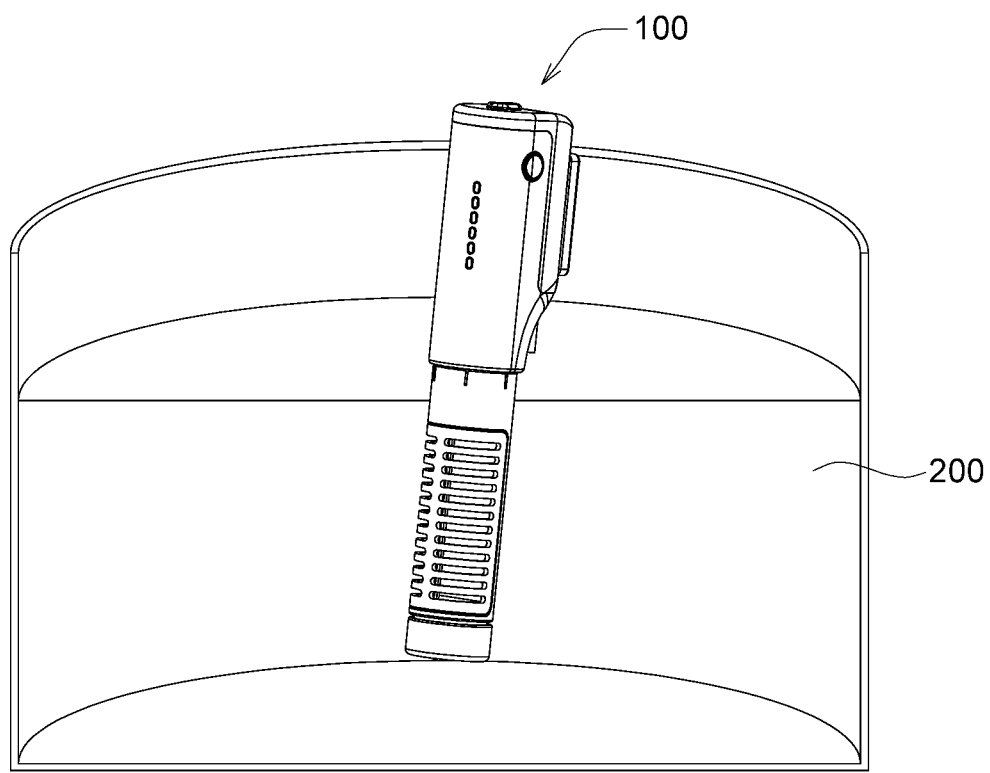
FIG. 6 is a use diagram of a residual toxicant detection device according to an embodiment of the present disclosure.

Refer to FIG. 6, a use diagram of a residual toxicant detection device 100 according to an embodiment of the present disclosure is shown. The residual toxicant detection device 100 of the present disclosure can be placed in an aqueous solution 200. The residual toxicant detection device 100 is emerged in the aqueous solution up to the sensing cavity cover so that the aqueous solution can naturally flow to the sensing cavity through the sensing cavity cover. Then, the light emitted by the light source passes though the sensing cavity filled with the aqueous solution to be received by the photo sensor which then continuously detects the absorbance of the residual toxicant in the aqueous solution.

To summarize, the residual toxicant detection device of the present disclosure detects the variation of residual toxicants in a water solution according to a photo sensing mechanism. The residual toxicant detection device can be directly placed in the aqueous solution, which will naturally flow to the detection cavity. There is no need for the device to consume power for sampling. Furthermore, the detection result is displayed through indicators. The residual toxicant detection device of the present disclosure is suitable for ordinary families to detect residual toxicants at home. Also, through the design of combining the lens and the optical path, the residual toxicant detection device of the present disclosure at least doubles the utilization rate of the light. On one hand, the detection limit is increased. On the other hand, the design of combining the design of combining the SMD LED light source with the lens further reduces the cost. The residual toxicant detection device of the present disclosure not only provides waterproof and wireless charging capabilities, but also achieves a high degree of practicality.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A residual toxicant detection device, comprising:
   a first space cavity, comprising:
      a light source configured to emit a light with a specific wavelength range and disposed on a substrate;
      a lens separated from the light source by a first distance; and
      a fixing ring whose top configured to fix the lens, wherein the fixing ring has a funnel-shaped structure at an end by which the fixing ring fixes the lens, and a side wall of the funnel-shaped structure has an angle of inclination extended upwards at a part close to the light source:
   a second space cavity, comprising:
      a photo sensor configured to receive the light with the specific wavelength range and obtain a sensing signal; and
      a circuit module electrically connected to the light source and the photo sensor;
   a connecting frame configured to connect the first space cavity and the second space cavity; and
   a sensing cavity formed between the first space cavity and the second space cavity and on one side of the connecting frame and configured to receiving an aqueous solution, wherein the light emitted by the light source of the first space cavity passes through the sensing cavity to enter the photo sensor of the second space cavity.

2. The residual toxicant detection device according to claim 1, wherein a bottom of the fixing ring is further configured to fix the light source such that the light source and the lens maintain the first distance.

3. The residual toxicant detection device according to claim 1, wherein the angle of inclination of 30°.

4. The residual toxicant detection device according to claim 1, wherein the circuit module calculates an absorbance of the residual toxicant in the aqueous solution according to the sensing signal.

5. The residual toxicant detection device according to claim 1, wherein the circuit module calculates a variation in the absorbance of the residual toxicants in the aqueous solution by continuously detecting the aqueous solution in the sensing cavity by use of the light source and the photo sensor.

6. The residual toxicant detection device according to claim 1, further comprising:
a battery configured to provide power for the light source, the photo sensor and the circuit module.

7. The residual toxicant detection device according to claim 1, wherein the light source and the photo sensor are respectively disposed on two sides of the sensing cavity, or disposed on two opposite sides of the first space cavity and the second space cavity.

8. The residual toxicant detection device according to claim 1, further comprising:
a display unit disposed on an outer surface of the second space cavity and configured to displaying different colors according to a variation in the absorbance.

9. The residual toxicant detection device according to claim 1, wherein the second space cavity further comprises a switch button configured to activate an operation of the residual toxicant detection device.

10. The residual toxicant detection device according to claim 1, further comprising:
a sensing cavity cover configured to cover the sensing cavity.

11. The residual toxicant detection device according to claim 10, wherein the sensing cavity cover comprises a plurality of holes which are arranged neatly or alternately.

12. The residual toxicant detection device according to claim 11, wherein an area of a first opening of the holes on an outer surface of the sensing cavity cover is greater than an area of a second opening of the holes on an inner surface of the sensing cavity cover.

13. The residual toxicant detection device according to claim 11, wherein a shape of the holes is circular, squared, rectangular or hexagonal.

14. The residual toxicant detection device according to claim 1, further comprising:
a dust-proof cap configured to cover the first space cavity, the sensing cavity and the connecting frame.

15. The residual toxicant detection device according to claim 1, wherein the first space cavity further comprises a bottom lid and a waterproof ring.

16. The residual toxicant detection device according to claim 1, wherein the light source and the photo sensor are plural.

* * * * *